United States Patent
Marr et al.

(10) Patent No.: US 10,152,369 B2
(45) Date of Patent: Dec. 11, 2018

(54) COMPUTE RESOURCE MONITORING SYSTEM AND METHOD ASSOCIATED WITH BENCHMARK TASKS AND CONDITIONS

(71) Applicant: ACTIVISION PUBLISHING, INC., Bothell, WA (US)

(72) Inventors: Michael D. Marr, Monroe, WA (US); Keith S. Kaplan, Bothell, WA (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 85 days.

(21) Appl. No.: 14/701,375

(22) Filed: Apr. 30, 2015

(65) Prior Publication Data

US 2016/0085607 A1 Mar. 24, 2016

Related U.S. Application Data

(60) Provisional application No. 62/054,897, filed on Sep. 24, 2014.

(51) Int. Cl.
| | | |
|---|---|---|
| G06F 11/07 | (2006.01) | |
| G06F 11/30 | (2006.01) | |
| G06F 11/34 | (2006.01) | |

(52) U.S. Cl.
CPC ...... *G06F 11/0793* (2013.01); *G06F 11/0709* (2013.01); *G06F 11/0715* (2013.01); *G06F 11/0724* (2013.01); *G06F 11/0757* (2013.01); *G06F 11/30* (2013.01); *G06F 11/3428* (2013.01)

(58) Field of Classification Search
CPC . G06F 11/3428; G06F 11/079; G06F 11/0793
See application file for complete search history.

(56) References Cited

U.S. PATENT DOCUMENTS

| | | | |
|---|---|---|---|
| 7,412,448 B2* | 8/2008 | Agarwal | G06F 11/008 |
| 9,135,440 B2* | 9/2015 | Prowell | G06F 21/566 |
| 9,225,621 B2* | 12/2015 | Tseitlin | H04L 43/08 |
| 9,274,918 B2* | 3/2016 | Heilper | G06F 11/34 |
| 2011/0239220 A1* | 9/2011 | Gibson | G06F 1/3206 718/103 |
| 2013/0185021 A1* | 7/2013 | Addison | G06F 11/3428 702/186 |
| 2013/0198722 A1* | 8/2013 | Adams | G06F 11/3428 717/127 |
| 2014/0143776 A1* | 5/2014 | Richard | G06F 11/3003 718/1 |
| 2016/0188449 A1* | 6/2016 | Machida | G06F 11/3433 717/131 |

* cited by examiner

*Primary Examiner* — Joseph R Kudirka
(74) *Attorney, Agent, or Firm* — Vista IP Law Group LLP

(57) ABSTRACT

A method for monitoring the health of a compute resource includes determining a baseline for the amount of time required for the resource to complete a specific task, monitoring the resource to measure the amount of time actually used by the resource to complete the task in a given instance, comparing the baseline time to the measured time, and determining if the resource is operating within acceptable tolerances based on the comparison. An alert may be created or other remedial action may be taken if the resource is not operating within acceptable tolerances.

12 Claims, 2 Drawing Sheets

COMPUTE RESOURCE MONITORING SYSTEM AND METHOD ASSOCIATED WITH BENCHMARK TASKS AND CONDITIONS

RELATED APPLICATIONS

This Application claims the benefit of U.S. provisional Application No. 62/054,897 filed on Sep. 24, 2014, in accordance with 35 U.S.C. Section 119(e), and any other applicable laws. The contents of the aforementioned application(s) are hereby incorporated herein by reference in their entirety as if set forth fully herein

FIELD OF THE INVENTION

The present invention relates generally to monitoring the performance of compute resources, data centers, and server fleets.

BACKGROUND OF THE INVENTION

With the rise of server-based computing applications and paradigms such as e-commerce marketplaces, cloud-based computing, and online multiplayer gaming, it is not uncommon for large companies and enterprises to have data centers or server fleets with hundreds, if not thousands, of servers or other compute resources.

Monitoring the health of these compute resources and identifying failure points is critical for ensuring acceptable performance levels and for preventing outages. Common monitoring solutions often use complex hardware-based systems installed at data centers or in the rooms housing server fleets. These monitoring systems, however, can be expensive and often are not practical or cost-effective for smaller data centers or server fleets.

Many modern microprocessors such as central processing units (CPUs), graphical processing units (GPUs), and other semiconductor devices are capable of dynamic frequency scaling (or self-throttling), in which the device dynamically adjusts its frequency in response to hardware-measured failures or other marginal conditions relating to, for example, operating temperature or power consumption. These semiconductor devices thus have built-in hardware monitoring components. It would be desirable to leverage these built-in hardware monitoring components to monitor compute resources, data centers, or server fleets without the need for additional monitoring infrastructure.

SUMMARY OF THE INVENTION

One aspect of the invention relates to a computer-implemented method of monitoring a first compute resource, the method being implemented by a computer that includes one or more physical processors, the method comprising: determining, by the computer, a first baseline time required for the first compute resource to complete a first benchmark task under a first set of benchmark conditions; monitoring, by the computer, the first compute resource during execution of a first monitored task under a first set of monitored conditions, wherein the first monitored task is the same or substantially similar to the first benchmark task, and the first set of monitored conditions is the same or substantially similar to the first set of benchmark conditions; determining, by the computer, a first monitored time used by the first compute resource to complete the first monitored task under the first set of monitored conditions; comparing, by the computer, the first monitored time to the first baseline time; and determining, by the computer, if the first compute resource is operating within acceptable tolerances based on the comparison.

The present invention is generally more cost effective than hardware-based solutions. Once the monitoring software embodying the invention has been deployed to a particular server, the cost for deploying the software to additional servers across a fleet of servers is minimal. Further, unlike hardware solutions, the present invention can be automatically configured for a variety of compute resources. By monitoring and analyzing data collected for a particular compute resource, the present invention can form a profile for each compute resource. These and other aspects of the invention are discussed herein.

DETAILED DESCRIPTION OF THE EMBODIMENTS

Figure 1:
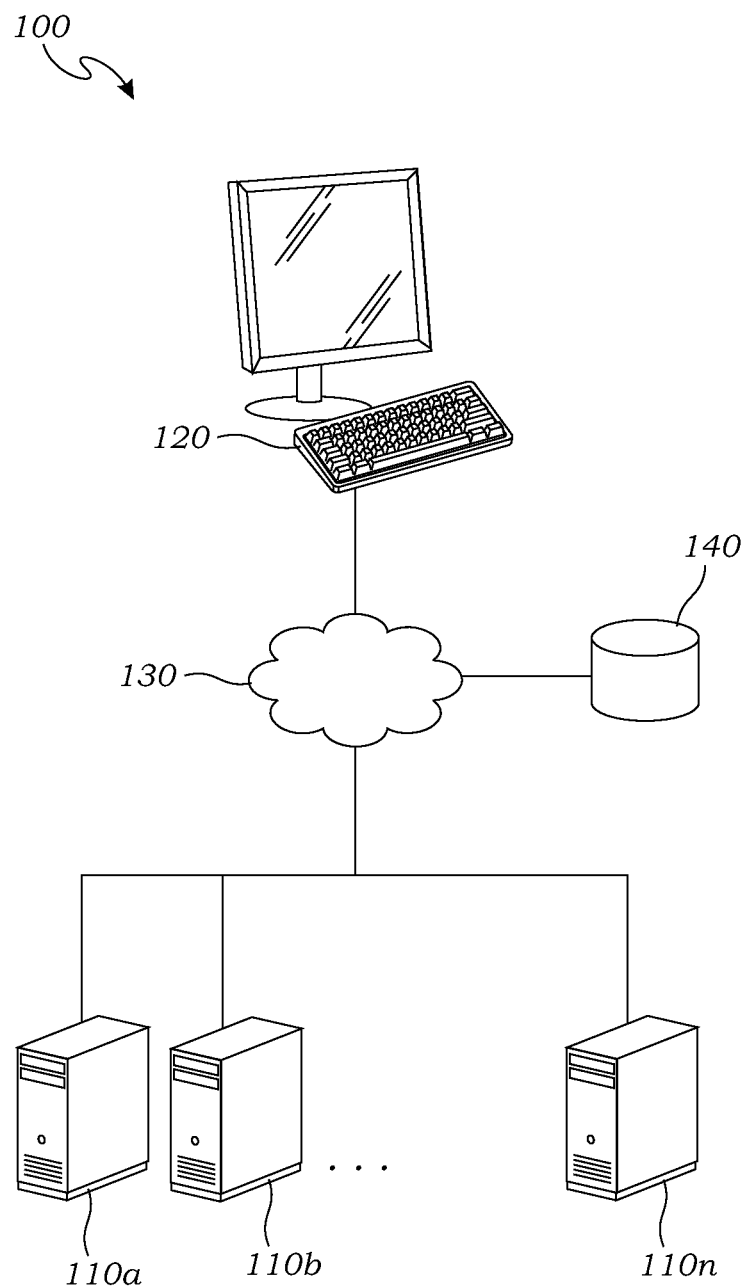
FIG. 1 shows a block diagram illustrating a system in accordance with an embodiment of the present invention.

FIG. 1 is a block diagram illustrating an exemplary system 100 in accordance with aspects of the present invention. System 100 allows for the monitoring of one or more compute resources 110a, 110b . . . 110n (or data centers housing said compute resources) without the need for hardware-based monitoring systems external to the compute resources. Compute resources 110a, 110b . . . 110n may be any device suitable for processing data, including without limitation, servers, workstations, personal computers, etc. In addition to compute resources 110a, 110b . . . 110n, system 100 comprises one or more administrator resources 120. System 100 also comprises one or more databases 140. Although shown to be separate from administrator resource 120 and compute resources 110a, 110b . . . 110n, in some embodiments, database 140 may be integral to administrator resource 120 and/or compute resources 110a, 110b . . . 110n. System 100 further comprises a communication network 130, which may be the Internet, for example. Compute resources 110a, 110b . . . 110n and administrator resources 120 each have one or more processors, memory, communication circuitry, and associated hardware. Compute resources 110a, 110b . . . 110n and administrator resources 120 can communicate with each other by sending and receiving data through communication network 130. The number of devices shown in FIG. 1 is merely exemplary, and in many embodiments, many more resources may be present.

Administrator resource 120 executes program instructions for monitoring the health and performance of compute resources 110a, 110b . . . 110n (herein referred to as "monitoring software"). Additionally or alternatively, the monitoring software, or portions of the monitoring software, may be distributed and executed on the compute resources themselves. For example, in some embodiments, portions of the monitoring software may be run on administrator resource 120, database 140, and each compute resource 110a, 110b . . . 110n. In some embodiments, monitoring software may be exclusively deployed on one or more compute resources 110a, 110b . . . 110n, in which case, the one or more compute resources may perform the functions of administrator resource 120 and/or database 140.

The monitoring software monitors the performance and health of compute resources 110a, 110b . . . 110n. More particularly, the monitoring software utilizes hardware-based monitoring components built-in to modern microprocessors (e.g., CPUs and GPUs) and other semiconductor devices (e.g., memory components) to determine and/or infer the health of a compute resource. For example, microprocessors and other semiconductor devices dynamically scale their performance (e.g., clock rate, voltage, etc.) to manage hardware-measured failures or other marginal conditions. Leveraging this built-in performance scaling, the monitoring software measures the performance of common tasks ("benchmark tasks") executed on compute resources 110a, 110b . . . 110n. "Benchmark" as used herein means a known and measured workload, which may be an artificial workload, or a real-world computational task. If a compute resource's monitored execution of a benchmark task is outside an acceptable performance level, the monitoring software can determine that the compute resource is not operating at an optimal or healthy state. As another example, disk speed may be monitored, and slower speed (perhaps caused by excessive sector sparing) may be considered a sign of a failing drive, or a failing fan cooling the drive. As discussed in more detail herein, in addition to directly detecting failing components (e.g., CPUs, GPUS, memory, etc.) in compute resources, the monitoring software of the present invention may also detect broader structural problems relating to a data center or server fleet. For example, if the monitoring software detects a group of failing compute resources located in the same vicinity (e.g., in the same data center, server rack, or the same room), it may be able to determine a potential issue associated with the infrastructure of that location (e.g., a data center cooling or power failure).

Figure 2:
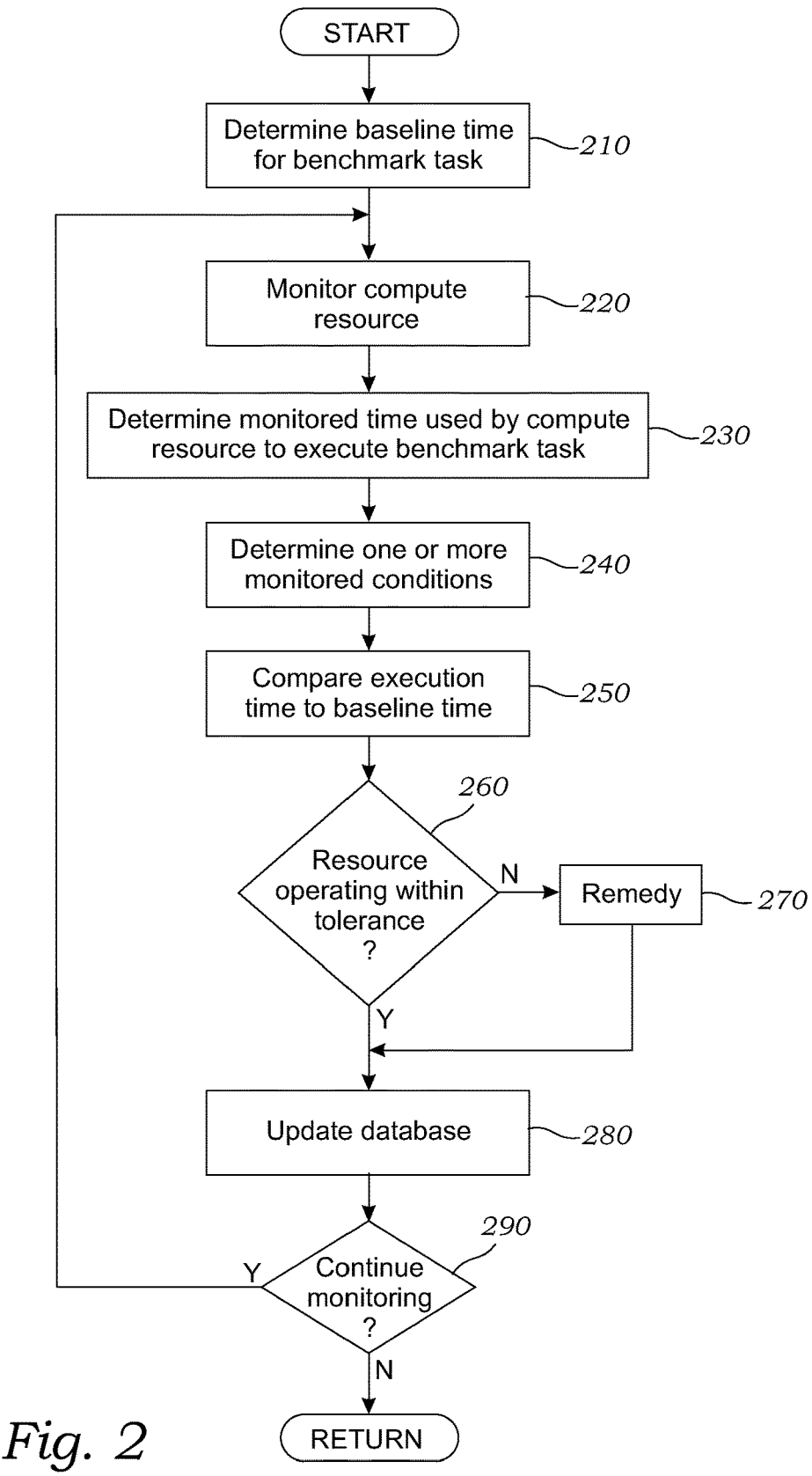
FIG. 2 shows a flowchart of a method of monitoring a compute resource in accordance with an embodiment of the present invention.

FIG. 2 depicts a flowchart of a process for monitoring one or more compute resources in accordance with aspects of the invention, which process will typically be embodied in the monitoring software. The process may be performed by one or more components of system 100, for example administrator resource 120, database 140, and/or one or more compute resources 110a, 110b . . . 110n. In Step 210, the process determines a baseline amount of time ("baseline time") required for the compute resource to execute a benchmark task under a certain set of benchmark conditions. A benchmark task may be any single task or any set of tasks performed by the compute resource.

In some embodiments, a benchmark task is one that is commonly executed on the compute resource being monitored. In this way, the benchmark task will provide sufficient data points for the monitoring software to determine the compute resource's health. Examples of commonly run benchmark tasks may include matchmaking in multi-player games, tracking leaderboards and player rankings, converting and/or compressing texture assets for a game to appropriate file formats for various game consoles, and calculating which entities in a video game scene are visible on a reflective surface.

In some embodiments, a benchmark task may be one that depends primarily on a particular component of a compute resource, thereby providing insight into the health of that particular component. For example, the performance a particular benchmark task may depend on the performance of the compute resource's CPU (or any other component). Accordingly, if the process determines there is a performance decrease in the execution of this particular benchmark task, it may infer a potential failure or suboptimal operating condition in a CPU, GPU, disk, or other hardware as applicable.

To determine the baseline time for the benchmark task, the process determines the amount of time it takes for a compute resource to perform the benchmark task under a certain set of benchmark conditions. The baseline time may be based on a single execution of the benchmark task under a particular set of benchmark conditions. Additionally, or alternatively, the baseline time may be based on multiple executions of the benchmark task (e.g., an average of execution times) under a particular set of benchmark conditions. Other techniques may be used to calculate a baseline time, including modified averaging techniques such as eliminating extreme data points, or weighted averaging techniques in which certain data points are given additional weight (e.g., most/least recent data points given more/less mathematical significance). These techniques may be performed using data from a single computer, or data from multiple computers with substantially similar configurations, performing substantially similar tasks.

In addition, different baseline times may be determined for a given benchmark task based on different sets of benchmark conditions. For example, a given benchmark task may have a first baseline time for execution under a first set of benchmark conditions and a second baseline time for execution under a second set of benchmark conditions. An example of a benchmark condition is CPU usage, for example below 50% versus or above 50%. Another example is size, resolution, and/or level of detail of an incoming asset. In the second case, for example, for a benchmark task of compression, a first baseline time may exist for compressing an asset having a 256×256 pixel texture, and a second may exist for compressing an asset having a 1024× 1024 pixel texture. The benchmark times for the same task operating under different conditions may be determined by performance, as described above, or by applying a function, such as in the example above wherein 16 times the pixels could translate into 16 times the expected compute time. Another function could be that if a fleet of mixed hardware includes some machines with older GPUs and some with newer GPUs, the newer GPUs could be expected to perform x % faster than the older ones, and so if a newer GPU is less than x % faster, it could be flagged or considered a failed piece of hardware.

As discussed herein, when determining the baseline time for a compute resource to complete a benchmark task, the process may further determine one or more benchmark conditions relating to the performance of the compute resource. The one or more benchmark conditions may comprise any condition impacting the performance of the compute resource. For example, conditions may include aspects relating to the current or past state of the compute resource (e.g., number or type of processes/threads running, CPU load, CPU power state, memory load, etc.), aspects relating to the compute resource's network interface (e.g., overall network congestion, bandwidth utilization, packet delivery retries, etc.), or aspects relating to the infrastructure (e.g., data center temperature, average CPU load of compute resources in the data center or group of compute resources, average power consumption of compute resources in a data center or group of compute resources, etc.).

In some embodiments, the process continuously monitors the execution of benchmark tasks and stores the various monitored execution times and associated conditions into a database. Over time, the process develops a detailed record of execution times for various benchmark tasks under many benchmark condition sets. Performance data and baseline times can be created and compiled for a wide array of compute resources. This data can then be used to create customized performance profiles for different compute resources. For example, two servers with identical components may nevertheless perform differently based on manufacturing variations. The process can create different performance profiles for the two servers based on actual observed performance as opposed to assuming the two servers will perform at a certain level.

Once the baseline time is determined for a benchmark task, the process proceeds to Step 220. At Step 220, the process monitors the compute resource during execution of the benchmark task (or a substantially similar task). The process then determines the amount of time used by the compute resource to complete the benchmark task in this instance ("monitored time"), as shown at Step 230. In some embodiments, the process further determines one or more monitored conditions relating to the current execution of the task, as shown at Step 240.

At Step 250, the monitored time is then compared to the baseline time. If one or more monitored conditions were determined at Step 240, the process may select a baseline time with benchmark conditions that reflects (e.g., are identical or similar to) the monitored conditions, or the process may calculate a baseline time using a function as described above in the examples of a 256×256 asset versus a 1024× 1024 asset, or an older GPU versus a newer GPU. At Step 260, the process then determines based on the comparison, whether the compute resource is operating within an accepted tolerance. If the monitored time is within a tolerance or margin of error (i.e., at or below the baseline time, or exceeding the baseline time by less than a predefined or calculated amount), as reflected by the Y branch, the process concludes that the compute resource is operating in good health, and proceeds to Step 280. If the compute resource is operating outside acceptable tolerances as indicated by the N branch, the process takes remedial action as seen at Step 270. The remedial action may be, for example, creating an alert (e.g., audible notification, email, visual notification, logging, reporting, mechanical, and/or any other alert). In some embodiments, the remedial action may comprise shutting down the failing compute resources, and/or other infrastructure-related remedies (e.g., varying the temperature of the data center or room housing the compute resources, varying the power supply).

In some embodiments, the process then proceeds to Step 280, in which the process updates the database with the monitored results (e.g., monitored time, monitored conditions, health of compute resource). In some embodiments, the baseline time for the benchmark task is updated in view of the current monitored time and/or monitored conditions. In other embodiments, the baseline time for the benchmark task is not updated, but the current monitored time and/or conditions are still logged. In some embodiments, the process allows an administrator to manually update the new database record with additional information. For example, if a benchmark task was observed to be outside of acceptable tolerances, the administrator may determine the root cause of the failure and update the database record for this particular execution with this information. Over time, the process may correlate the failure (or degree or type of failure) of certain benchmark tasks and/or conditions with certain root causes. In this manner, a suspect cause of failed performance or underperformance may be determined by correlating the performance of the monitored task (such as the performance time) with a known metric associated with the suspect cause, and more focused, remedial action may be taken to remedy the suspect cause.

For example, the failure of Benchmark Task A (e.g., by slowing down by 10%) may be associated with an overheating GPU, while the failure of Benchmark Task B may be associated with a failing memory device. Likewise, this may be inferred across workloads. For example, if two different GPU benchmarks run at 10% below expected performance when the GPU is overheating, it may be inferred for new GPU tasks that a 10% degradation in performance corresponds to overheating.

The process then proceeds to Step 290 where it is determined whether the monitoring software should continue monitoring the one or more compute resources. If so, the process loops back to Step 220, as shown by the Y branch. If not, the process returns, as reflected by the N branch.

The process may be performed simultaneously or substantially simultaneously on multiple compute resources. In such situations, the tasks being executed by the various compute resources may be substantially similar or not, and the conditions under which the various resources are operating may be substantially similar or not. Depending on those factors, the baseline times determined at Step 210 and 280 for the different tasks under different conditions may be different, or the tolerance(s) may be adjusted prior to Step 250 to allow for a wider (or narrower) discrepancy between the baseline time and the current execution time before taking remedial action at Step 270.

In some embodiments, the process monitors the performance of multiple compute resources to determine infrastructural health. For example, if multiple compute resources are performing outside of acceptable tolerances with a particular server rack, the process may infer an infrastructural failure and take appropriate remedial action (e.g., increased cooling in the data center, review of vendor performance, replacement of a top rack switch, relocation of servers to avoid electrical interference, etc.).

Although particular embodiments have been shown and described, the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims. The invention, therefore, should not be limited, except to the following claims, and their equivalents.

What is claimed is:

1. A computer-implemented method of monitoring a first compute resource, the method being implemented by a computer that includes one or more physical processors, the method comprising:

the computer executing a first benchmark task under a first set of benchmark conditions and measuring a first baseline time required for the first compute resource to complete the first benchmark task under the first set of benchmark conditions;

monitoring, by the computer, the first compute resource during execution of a first monitored task under a first set of monitored conditions;

the computer measuring a first monitored time used by the first compute resource to complete the first monitored task under the first set of monitored conditions;

comparing, by the computer, the first monitored time to the first baseline time;

determining, by the computer, that the first compute resource is not operating within acceptable tolerances based on the comparison;

determining, by the computer, a suspect cause as to why the first compute resource is not operating within the acceptable tolerances, by correlating the first monitored time with a known metric associated with the suspect cause;

taking, by the computer, remedial action to remedy the suspect cause, the remedial action comprising shutting down the first compute resource; and the computer updating the first baseline time based on the first monitored time.

2. The computer-implemented method of claim 1, wherein the remedial action further comprises creating an alert.

3. The computer-implemented method of claim 1, wherein the first set of benchmark conditions comprises a first benchmark CPU load associated with the first compute resource.

4. The computer-implemented method of claim 1, wherein the first baseline time is based on at least two executions of the first benchmark task on the first compute resource under the first set of benchmark conditions.

5. The computer-implemented method of claim 1, further comprising:

the computer measuring a second baseline time required for a second compute resource to complete a second benchmark task under a second set of benchmark conditions;

monitoring, by the computer, the second compute resource during execution of a second monitored task under a second set of monitored conditions;

the computer measuring a second monitored time used by the second compute resource to complete the second monitored task under the second set of monitored conditions;

comparing, by the computer, the second monitored time to the second baseline time; and determining, by the computer, that the second compute resource is not operating within acceptable tolerances based on the comparison.

6. The computer-implemented method of claim 5, further comprising taking, by the computer, a second remedial action in response to the determination that the second compute resource is not operating within acceptable tolerances.

7. The computer-implemented method of claim 6, wherein the second remedial action comprises creating an alert.

8. The computer-implemented method of claim 6, wherein the remedial actions taken are based on locations of the first and second compute resources.

9. A computer-implemented method of monitoring a first compute resource, the method being implemented by a computer that includes one or more physical processors, the method comprising:

the computer executing a first benchmark task under a first set of benchmark conditions and measuring a first baseline metric required for the first compute resource to complete the first benchmark task under the first set of benchmark conditions;

monitoring, by the computer, the first compute resource during execution of a first monitored task under a first set of monitored conditions;

the computer measuring a first monitored metric used by the first compute resource to complete the first monitored task under the first set of monitored conditions;

comparing, by the computer, the first monitored metric to the first baseline metric;

determining, by the computer, that the first compute resource is not operating within acceptable tolerances based on the comparison;

determining, by the computer, a suspect cause as to why the first compute resource is not operating within the acceptable tolerances, by correlating the first monitored metric with a known metric associated with the suspect cause;

taking, by the computer, remedial action to remedy the suspect cause, the remedial action comprising shutting down the first compute resource; and the computer updating the first baseline metric based on the first monitored metric.

10. The computer-implemented method of claim 9, wherein the first monitored metric used by the first compute resource to complete the first monitored task comprises a time measurement.

11. The computer-implemented method of claim 9, wherein the remedial action further comprises creating an alert.

12. The computer-implemented method of claim 9, wherein the remedial action further comprises scheduling fewer workloads to the first compute resource.

* * * * *